(12) United States Patent
Johnson

(10) Patent No.: US 6,928,704 B2
(45) Date of Patent: Aug. 16, 2005

(54) CABLE SUPPORT APPARATUS

(75) Inventor: Bruce D. Johnson, Bloomington, MN (US)

(73) Assignee: Windows Support Systems, Inc., Bloomington, MN (US)

( * ) Notice: Subject to any disclaimer, the term of this patent is extended or adjusted under 35 U.S.C. 154(b) by 0 days.

(21) Appl. No.: 10/714,002

(22) Filed: Nov. 14, 2003

(65) Prior Publication Data

US 2004/0093699 A1 May 20, 2004

Related U.S. Application Data

(63) Continuation-in-part of application No. 10/281,557, filed on Oct. 28, 2002, now abandoned.

(51) Int. Cl.[7] .......................... B63B 21/04; A44B 11/02
(52) U.S. Cl. .......................... 24/130; 114/218; D8/356
(58) Field of Search .............................. 24/130, 129 R, 24/129 A, 115 H, 115 M, 115 K, 122.6; 114/218; 188/65.2, 65.4; D8/356

(56) References Cited

U.S. PATENT DOCUMENTS

| | | | |
|---|---|---|---|
| 369,079 A | 8/1887 | Rowland | |
| D209,330 S | * 11/1967 | Coderre et al. | ............... D8/382 |
| 4,373,463 A | 2/1983 | Beaudette | |
| D287,097 S | 12/1986 | Nelson | |
| 4,649,664 A | 3/1987 | Mahan | |
| 5,245,729 A | 9/1993 | Greff | |
| 5,519,921 A | 5/1996 | Templer, Jr. | |
| 5,642,556 A | * 7/1997 | Alexander | ................... 24/130 |
| 5,987,710 A | * 11/1999 | Paul et al. | .................... 24/130 |
| 5,987,711 A | * 11/1999 | Parsons | ........................ 24/130 |
| 6,094,783 A | * 8/2000 | Parsons | ........................ 24/130 |
| 6,557,217 B2 | * 5/2003 | Szabo | ....................... 24/129 R |
| 6,571,854 B1 | * 6/2003 | Palmer et al. | ............. 24/129 R |
| 6,618,910 B1 | * 9/2003 | Pontaoe | ..................... 24/115 H |

* cited by examiner

Primary Examiner—Jack W. Lavinder
(74) Attorney, Agent, or Firm—Clayton R. Johnson

(57) ABSTRACT

The cable support apparatus includes a cleat mountable to support structure for having one end of a cable laced thereto and mechanism for supporting a load. The cleat includes a longitudinal elongated base having transversely opening jam lugs, hook lugs with the jam lugs longitudinally intermediate thereof and end lugs joined thereto. The jam lug longitudinally intermediate the longitudinally adjacent jam lugs in combination with the base forms generally V-shaped notches that open outwardly in transversely opposite directions. With the cleat mounted to have the lugs vertically above one another, the top hook lug opens transversely opposite the opening of the adjacent jam lug whereby, with the cable extending diagonally upwardly from the last mentioned jam lug to the hook lug, the cable is then bent to extend through the transverse aperture in the top end lug.

17 Claims, 4 Drawing Sheets

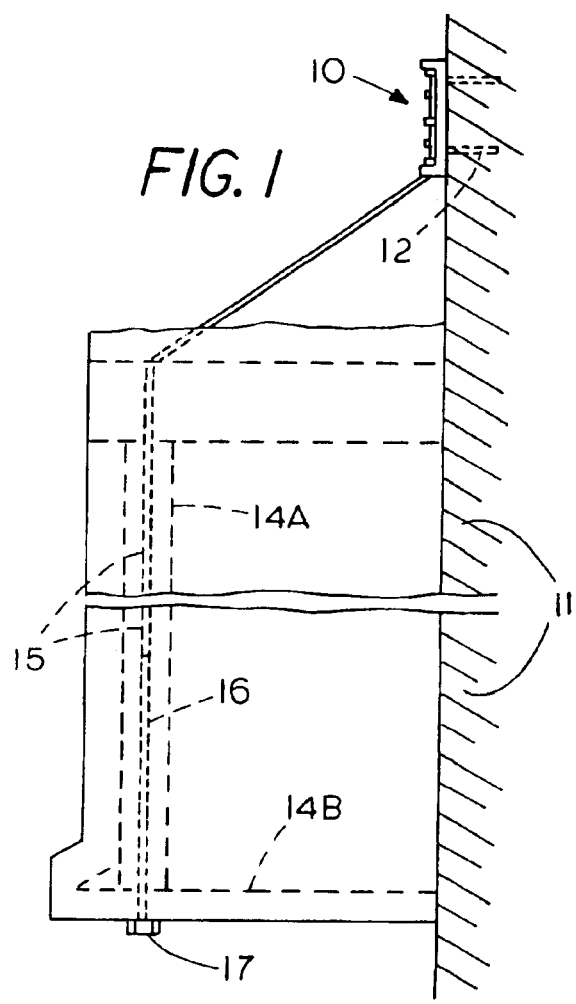
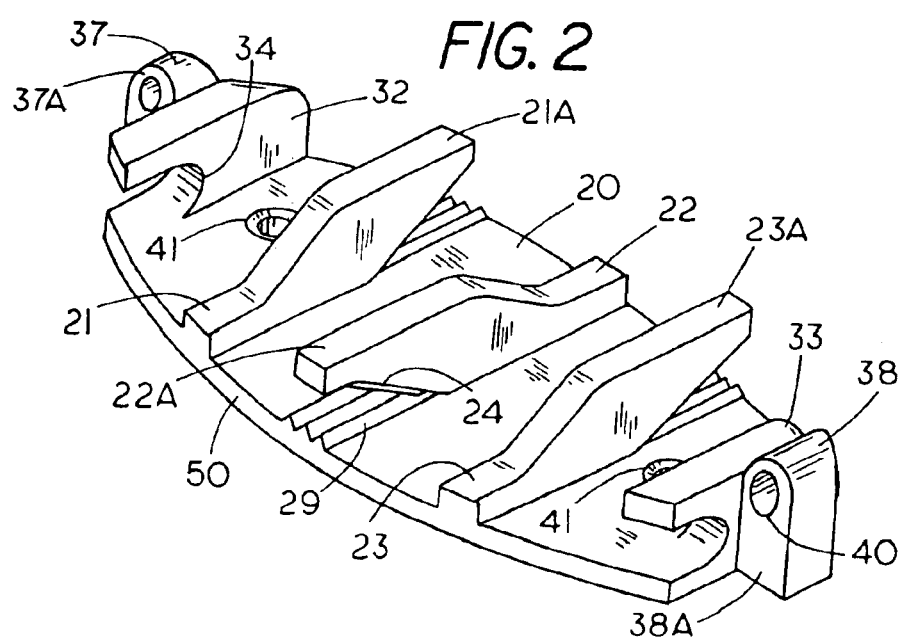

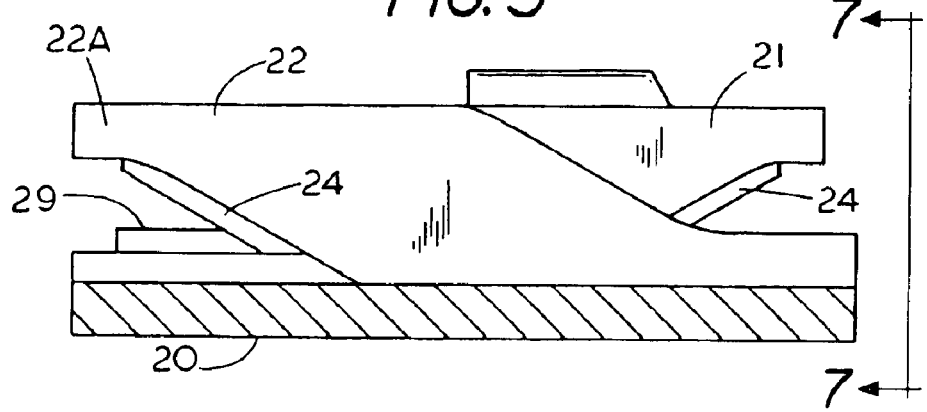
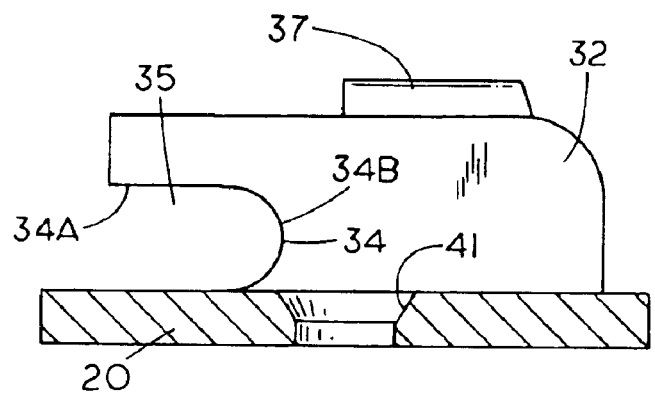
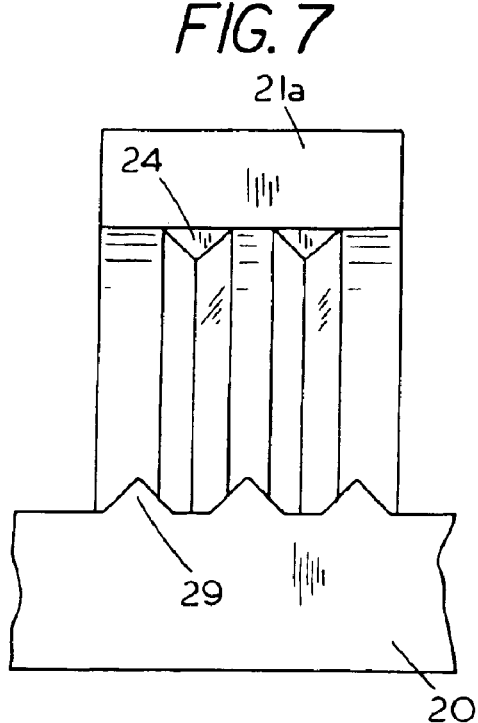

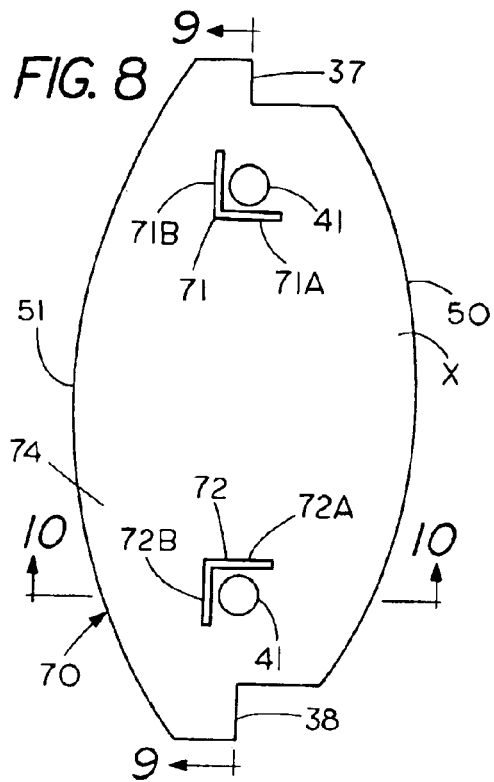
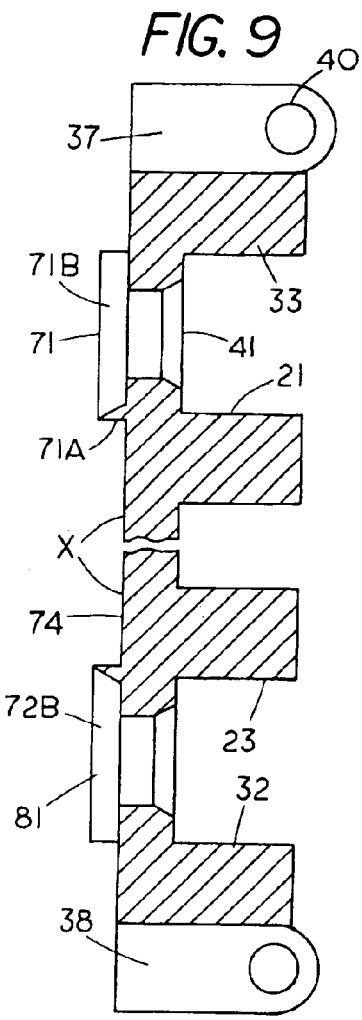
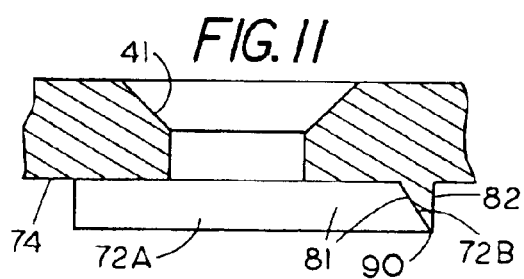
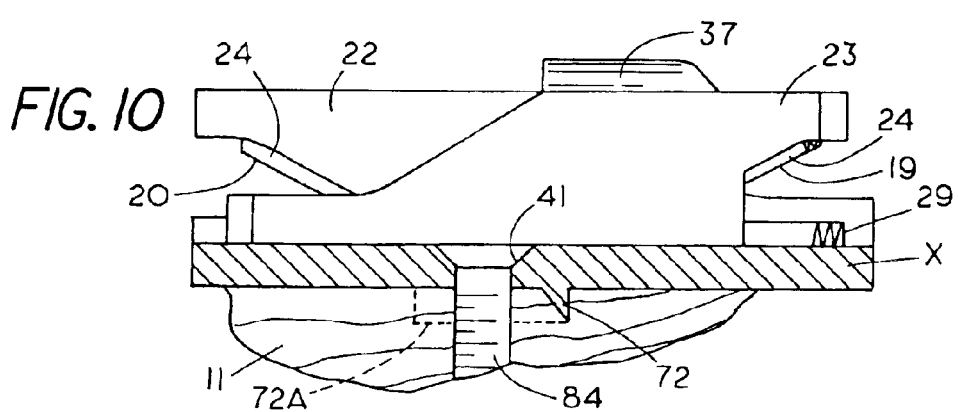

CABLE SUPPORT APPARATUS

RELATED APPLICATIONS

This application is a continuation-in-part of Ser. No. 10/281,557, filed Oct. 28, 2002, now abandoned.

BACKGROUND OF THE INVENTION

This invention is for apparatus for securing a cable in a fixed position while the cable is supporting other structure, for example bay and bow windows of a house.

At the present time there are cleat devices that are mountable to a house and have cables laced in abutting relationship to jam lugs and the ends of the cables remote from the loads being supported are bent at about right angles from the adjacent lugs and are secured to the housing by U-shaped (fence) staples to prevent the cables slipping relative to the housing while supporting loads.

U.S. Pat. No. 4,373,463 to Beaudette discloses a cleat device having adjacent oppositely opening jam cleats intermediate a pair of hooks for restraining a flexible line with one of its end portions laced in abutting relationship to the jam cleats and the hooks.

In order to provide devices that are relatively inexpensive and usable to retain one end portion of a cable or a rope in a fixed condition without requiring the use of supplement devices to retain the end portion of the cable in a fixed position, this invention has been made.

SUMMARY OF THE INVENTION

The support apparatus includes a base that is mountable to support structure, for example a side of a house, and has a several longitudinally adjacent, oppositely transversely opening jam lugs, hook lugs that are adjacent the ends of the base and open transversely opposite the opening of the adjacent jam lug and end lugs that have apertures extending transversely therethrough to have one of the end portions the cable or rope that is remote from the loads being supported extended thereinto one of the end lug apertures. One of the embodiments has chisel point ridges for penetrating into the supporting structure to provide greater stability in retaining the structure being supported in the desired condition.

An object of this invention is to provide a new and novel cleat for having a cable or rope in laced relationship thereto for retaining one end portion of a cable or rope in a fixed position without the need to provide an additional device to retain the cable or rope in a fixed position.

BRIEF DESCRIPTION OF THE DRAWINGS

FIG. 1 is a somewhat diagrammatic showing of the use of the cleat of the first embodiment of the invention for supporting a bay window, only parts of the bay window being shown;

FIG. 2 is a perspective view of the apparatus of the first embodiment of the invention;

FIG. 5 is a transverse cross sectional view generally taken along the line and in the direction of the arrows 5—5 of FIG. 3;

FIG. 6 is a transverse cross sectional view generally taken along the line and in the direction of the arrows 6—6 of FIG. 3—3 showing a cleat hook lug and the mounting aperture;

FIG. 7 is a fragmentary longitudinal end view showing one of the jam lugs that is generally taken along the line and in the direction of the arrows 7—7 of FIG. 5.

FIG. 8 is a bottom view of the cleat base of the second embodiment of this invention;

FIG. 9 is an enlarged, fragmentary, longitudinal cross sectional view of the cable cleat of the second embodiment with a longitudinal intermediate portion broken away, said view being generally taken along the line and in the direction of the arrows 9—9 of FIG. 8;

FIG. 10 is an enlarged, fragmentary, transverse cross sectional view of the cable cleat of the second embodiment that is generally taken along the line and in the direction of the arrows 10—10 of FIG. 8; and FIG. 11 is a further enlarged, fragmentary cross sectional view to show one of the chisel point ridges dependingly joined to the cleat base of the second embodiment.

DESCRIPTION OF THE PREFERRED EMBODIMENT

Figure 3:
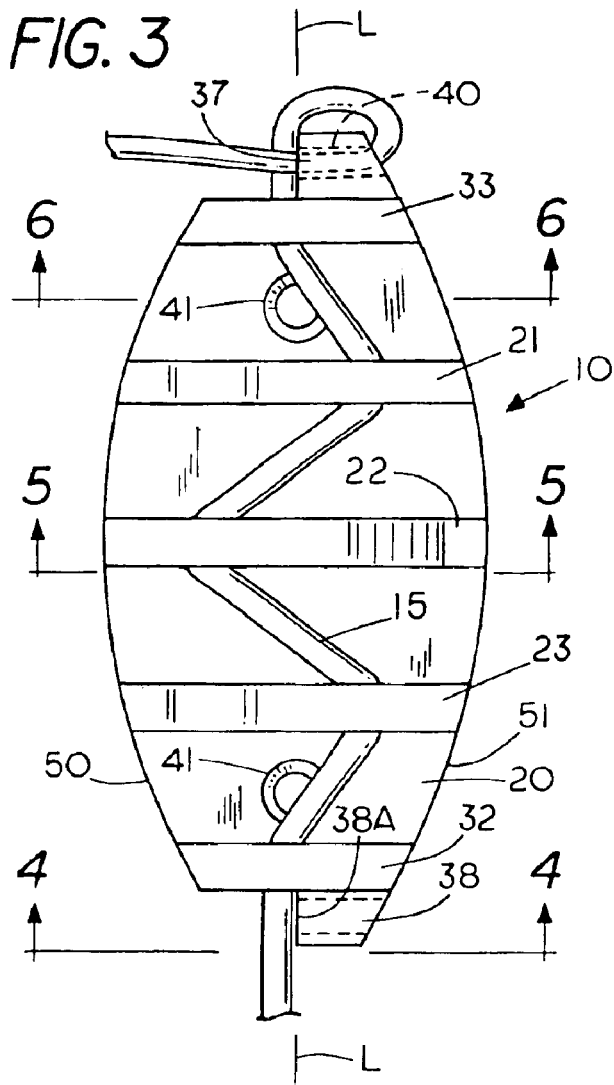
FIG. 3 is a plan view of the first embodiment of the cleat of this invention showing the end portion of a cable remote from the load to be supported in laced relationship to the cleat lugs.
Figure 4:
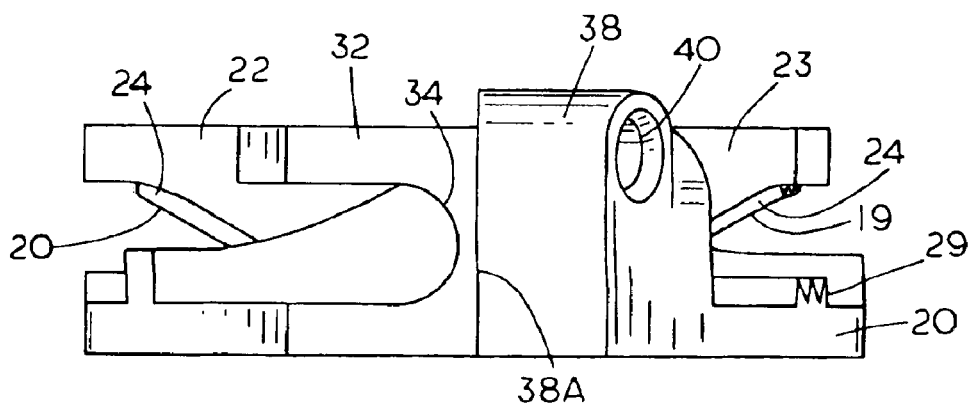
FIG. 4 is a transverse cross sectional view generally taken along the line and in the direction of the arrows 4—4 of FIG. 3.

Referring to the drawings, and in particular to FIG. 1, there is diagrammatically shown a cleat of the first embodiment, generally designated 10, mounted by nails or screws 12 to an exterior wall 11 or to an overhanging part (not shown) of a house above a bow or a bay window 14 which is generally shown in outline other than for the dotted line showing of a mullion 14A and a seat board 14B of the window. The mullions 14A are remote from the house exterior wall. Conventional cable assemblies may be used in conjunction with the cleats of this invention to prevent or minimize sagging of bay or bow windows. Such cable assemblies may include a cable, a rod, fasteners and may include a turnbuckle.

One end portion of a cable 15 is laced to the cleat while an intermediate portion is extended downwardly through a mullion and has its lower end joined to a rod 16 which extends downwardly through the seat board. The use of a cable extending into and/or at least partially through a mullion is conventional. A suitable fastener 17, for example a washer and nut, are mounted to the lower end of the rod in supporting relationship to the seat board to minimize possible sagging of the window.

For the most part, for facilitating the description of the cleat 10, it will be assumed the cleat is on a horizontal support surface. The cleat 10 of this invention includes a longitudinally elongated base 20 having transversely opposite longitudinal edges 50, 51. Three transversely extending jam lugs 21, 22, 23 are joined to the base in longitudinally spaced relationship to extend across the base and above the top surface of the base. As may be seen from FIG. 2, the longitudinally intermediate jam lug 22 opens transversely opposite from the opening of the adjacent jam lugs 21, 23. That is, each jam lug has a jaw portion 21A, 22A, 23A respectively with an undersurface that, in a direction transversely away from the longitudinal axis L—L, diverges away from the base top surface at an acute angle and has a portion remote from the longitudinal axis extending generally parallel or horizontally from the diagonal portions of the undersurface to be in overlapping relationship to the base. The under surface of each jaw portion is in part defined by two transverse teeth or ridges 24, which may be generally triangular in longitudinal cross section, and diverge away from the base at the above mentioned acute angle.

Advantageously, the acute angle is about 30 degrees, but may be about 10 degrees smaller or greater.

The top surface of the base, other than for the jam lugs, the ridges or teeth 29 and the hooks 27, 28, is substantially flat. Beneath each of the lug jaws there are transversely extending ridges 29 which may be generally triangular in longitudinal cross section. The ridges 29 are joined to or form part of the base to extend above the generally flat top surface portions that extend between the jam lugs. The apexes of the ridges 29 are generally parallel to the adjacent flat top surface portions of the base. Advantageously, the apex of at least one of ridges 29 of each jaw portion extends in longitudinal alignment with the valleys of the ridges 24 while the apex of at least of one of the ridges 24 extends in longitudinal alignment with the valley between ridges 29. The intersection of the undersurfaces of the jam lugs 21, 23 with the base top surface is on the transversely opposite side of the longitudinal axis from the intersection of the undersurface of the jam lug 22.

The undersurfaces of the jaw portions of jam lugs 21, 23 in combination with the surface portions of the base therebeneath form transversely outwardly opening notches 19 while the undersurface of the jaw portion of jam lug 22 in combination with the surface portion of the base therebeneath form a transversely outwardly opening notch 20. With the notch of jam lug 22 being on the opposite side of the longitudinal axis from that of the notches of jam lugs 21, 23, the notch of lug 22 is transversely offset from the notches of lugs 21, 23. Advantageously, the notches 19 and 20 are of the same shape and size but open in transversely opposite directions with the diagonally extending undersurfaces of the jam lugs and the vertically adjacent parts of the base form transversely outwardly opening notches that are generally V-shaped.

Joined to longitudinal opposite end portions of the base are hook lugs 32, 33 respectively that advantageously are longitudinally spaced from the adjacent jam lug the same as the spacing of each of the jam lugs from the adjacent jam lug. The jam lugs and the hook lugs extend parallel to one another. Each of the hook lugs has a cutout 34 that in combination with the base provide a notch 35 that opens transversely outwardly in the opposite transverse direction from the opening of the notches formed by the undersurfaces of the jam lugs 21, 23 respectively with the base. The minimum transverse spacing of the cutouts 34 from the longitudinal axis is on the transverse opposite side of the longitudinal axis from the minimum spacing of the notches 19 of lugs 21, 23 from said axis. The transverse outer parts of the cutouts (undersurface portions) 34A extend generally parallel to the vertically adjacent part of the base surface while the transverse inner part 34B is arcuately curved between the base and the horizontal part 34A. The minimum spacing of the undersurface 34A from the base is greater than the diameter of the cable that is to be laced to the cleat.

Joined to the hook lugs 32, 33 and the longitudinal opposite ends of the base are end lugs 37, 38 respectively. Each of the end lugs has a transverse aperture 40. The central transverse axis of each of the apertures is at a higher elevation than each of the base ridges 29 and advantageously the lowermost part of the apertures are at a higher elevation than the apexes of the ridges 29. Further, the central axes of the apertures 40 are at a higher elevation than hook lug undersurface portions 34A. Additionally, each end lug has a vertical, longitudinal surface 37A, 38A respectively that is on the transverse opposite side of the longitudinal axis from that of the arcuately curved surface portions 34B of the adjacent cutout or, if both are on the same transverse side of the longitudinal axis, the surfaces 37A, 38A are more closely adjacent to the longitudinal axis than hook lug arcuate surface portions 34B. Thus, the cutouts 34 are transversely offset from the surfaces 37A, 38A in the same transverse direction that the notches of the jam lugs 21, 23 are offset from the cutouts 34. That is, each of the end lugs has edge surface 37A, 38A respectively that extends generally vertically at right angles to the base and longitudinally and has the aperture opening therethrough, the end lug edge being transversely offset from the intersection of the arcuate portion with the base in the direction of the opening of the first lug undersurface.

In use, the cleat 10 is secured to the supporting structure, for example the exterior house wall 10 above the load 14, for example a bay window, that is to be supported by screws 12 extended through apertures 41 in the base and threaded into the supporting structure. The cleat is mounted to the supporting structure with one of the end lugs vertically above the other, for example end lug 37 above end lug 38.

The upper end portion of a cable 15 is laced to extend through the cutout of hook lug 32 and into the notch of the jam lug 23, thence into the notch of jam lug 22, then into the notch of the jam lug 21, thereafter into the cutout of hook lug 37 and finally bent to extend across the longitudinal axis to the transverse side of the end lug 37 that is opposite the opening of the cutout of hook lug 33 and reversibly bent to extend through the aperture of the end lug 37 and across the portion of the cable that extends from the cutout of hook lug 33 that is longitudinally opposite jam lug 21. Thus, the cable extends in a zigzag relationship to the base longitudinally between the hook lugs. That is, the cable in an upward direction extends upwardly from the hook lug 32 and transversely diagonally across the longitudinal axis to jam lug 23, then upwardly from the jam lug 23 to lug 22 transversely across the longitudinal axis in the diagonally opposite direction of the part of cable extending between hook lug 32 and lug 23, thereafter upwardly from lug 22 in the diagonally opposite direction to lug 21 to cross the longitudinal axis, thence diagonally upwardly in the opposite transverse direction to the hook lug 33 to be bent in the general plane of the base top surface through an arcuate angle over 100 degrees from the part that extends between lugs 21, 33 to extend to the transverse opposite side of end lug from the opening of the hook lug 33 and reversely bent to extend through the aperture 40 in the end lug 37 and across the part of the cable that extends upwardly of the hook lug 33. Advantageously, the arcuate angle is greater than 130 degrees. Further, the cable, in extending from the hook lug 33 and being reversely bent to extend through the end lug aperture 40, extends diagonally upwardly at an acute angle.

Prior to the cable being laced to the cleat, the cable is extended downwardly from the hook lug 32 and into the mullion remote from the house exterior wall and the lower end of the rod 16 has a fastener secured thereto to support the bay window. The cable is laced to the cleat to be taut between the cleat and the structure to be supported, the greater the load, the more deeply the cable is forced into the notches. With cable end portion being laced to the cable, the cable extends between the lugs and the base.

The end of the cable, in being bent to extend partially around the top hook lug, prevents the cable from becoming unlaced from the jam lugs. With reference thereto, in extending through the top aperture 40, the end portion of the cable in being pulled to unwind from the top hook, is prevented from doing so in that it can not straighten to extend generally upwardly relative to the top hook lug and the greater the force tending to unwind (unlace) the cable, the greater the resistance opposing such unwinding that results from the cable bearing against the inner peripheral wall defining the top aperture 40. In supporting a bay window or bow window, usually there is a cable extending into each of horizontally spaced mullions remote from the exterior wall and the cables are laced to horizontally spaced cleats, Referring to FIGS. 8–11, the second embodiment of the cable cleat of this invention, generally designated 70, includes a base X that is of the same construction as the base 20 of the first embodiment with the exception the base X has elongated chisel point ridges 71, 72 integrally joined to the substantially planar bottom surface 74 of the cleat base to extend away therefrom in a direction away from the top surfaces of the jam lugs 21, 22, 23. The chisel point ridges are longitudinally opposite one another with the ridge 71 having a longitudinally elongated portion 71B extending along one of apertures 41 of the base and ridge 72 has a longitudinally elongated portion 72B extending along the other aperture 41. Further, the chisel point ridge 71 has a transversely elongated portion 71A extending adjacent to the one aperture 41 of the base while the ridge 72 has a transversely elongated portion 72A extending along the other aperture 41. Accordingly, each chisel point ridge has a longitudinally extending portion and a transversely extending portion that is longitudinally between the apertures 41, but closely adjacent the respective aperture. Thus, each of the chisel point ridges has portions that extend horizontally at an angle other than 180 degrees relative to another portion of the same chisel point ridge.

It is to be understood that the chisel point ridges may be joined to the base to depend therefrom spaced at a spacing more remote from the apertures than shown in FIG. 8 and be oriented other that shown as long as each ridge has a longitudinally extending portion and a transversely extending portion. Advantageously, with the base having its planar bottom surface in a horizontal plane, each of the transverse and longitudinal chisel edge portions of each of the chisel point ridges is elongated in a horizontal direction and has its portions joined to extend at right angles.

Advantageously, each chisel point ridge has opposite surfaces 81, 82 that extended downwardly at relatively steep angles from the base bottom surface to provide a sharpened edge 90 such as shown in FIG. 11 of edge portion for chisel point ridge portion 72B. The surfaces 81, 82 are horizontally elongated when the planar bottom surface is horizontal and extend along the length of ridges 71, 72 respectively and converge toward one another in a direction downwardly of the base planar surface to intersect at the sharpened edge 90 that extends at least nearly the length of each of the respective chisel point ridges with the convergence of the surfaces 81, 82 advantageously being at an acute angle of about 15 degrees to 35 degrees and surfaces 82 extending at about right angles to the base planar bottom surface portion. The intersection of the surfaces 82 with the base planar surface is more remote from the adjacent aperture 41 than the intersection of the surfaces 81 with the base bottom surface.

The use of the second embodiment is the same as the first embodiment other than what occurs when the chisel point ridges engage the supporting surface. That is, the threaded screws 84 are extended through the mounting screw apertures 41,41 at each end portion of the cleat and threaded into the mounting structure 11 whereby the cleat is held in the desired location. During the mounting screws 84 being threaded to have their heads abut against the top chamfered portions of apertures 41 will force the chisel point ridges to penetrate into the supporting surface 11, assuming it is made of wood or similar material. Once the cleat is mounted to the supporting structure, the upper end portion of the cable is laced to the cleat and extended through the aperture 40 such as described relative to the first embodiment.

It is to be understood that the cleats may be mounted to parts of the house directly vertically above the mullions into which the cables extend or to extend from the mullions at acute angles other than that shown in the drawings.

What is claimed is:

1. A cleat device mountable to a supporting structure for having a cable or rope that supports a load laced thereto, comprising a base having a longitudinal axis, longitudinally opposite end portions and a top surface, at least three longitudinally spaced jam lugs joined to the base to extend above the top surface, the three jam lugs including a first and a second jam lug and an intermediate jam lug longitudinally intermediate the first and second jam lugs, each of the jam lugs at least one of alone and in combination with the base having a generally V-shaped notch, the intermediate jam lug notch opening transversely outwardly, the first and second lug notches opening transversely outwardly in a direction opposite the opening of the notch of the intermediate jam lug and on the transverse opposite side of the longitudinal axis from that of the notch of the intermediate jam lug to be transversely offset from the notch of the intermediate jam lug, a hook lug mounted to the base longitudinally opposite the first jam lug from the intermediate jam lug and having a cutout opening transversely outwardly in the direction opposite the opening of the notch of the first jam lug, the hook lug having an undersurface portion that is spaced from the base by a distance that is greater than the thickness of the cable, and an end lug joined to at least one of the base and the hook lug longitudinally opposite the hook lug from the first jam lug, the end lug having an aperture extending transversely therethrough for having the cable extended therethrough, the entire aperture being transversely offset from the cutout in the same direction that the first jam lug notch is offset from the cutout.

2. The device of claim 1 wherein the jam lugs are parallel to one another.

3. The device of claim 1 wherein each of the jam lugs has an undersurface that at least in part defines the respective notch and extends diagonally outwardly from the base at an acute angle in overlapping relationship to the base and the base has longitudinally opposite ends and the end lug is joined to one of the base ends.

4. The device of claim 1 wherein each of notches is at least in part defined by a base top surface portion underlying the respective jam lug undersurface and the end lug aperture is at a higher elevation than the base top surface portion.

5. The device of claim 1 wherein a second hook lug is joined to the base longitudinally opposite the second jam lug from the intermediate lug and the jam lugs and hook lugs are joined to the base in longitudinally spaced relationship with each each of theses lugs being spaced about the same longitudinal distance from the adjacent lug.

6. The device of claim 1 wherein a second hook lug is mounted to the base longitudinally opposite the second jam lug from the intermediate jam lug and has a cutout opening transverse outwardly in the same direction as the opening the notch of the intermediate jam lug.

7. The device of claim 1 wherein the base has a generally planar bottom surface and a first elongated chisel point ridge joined to the bottom surface to depend therefrom, the chisel point ridge having surfaces that converge toward one another in a direction away from the planar surface.

8. The device of claim 7 wherein the base has longitudinally elongated side surfaces and end surfaces and the chisel point ridge has a transversely elongated portion and a longitudinally elongated chisel point ridge portion.

9. The device of claim 8 wherein the base has a second elongated chisel point ridge joined to the bottom surface to depend therefrom, the second chisel point ridge having horizontally elongated surfaces that converge toward one another in a direction away from the bottom surface, the second chisel point ridge being joined to the base bottom surface longitudinally remote from the first ridge, the base having a vertical screw mounting aperture adjacent each of the chisel point ridges.

10. A cleat device mountable to a supporting structure for having a cable or rope that supports a load laced thereto, comprising a base having a longitudinal axis, longitudinally opposite ends and a top surface, at least three longitudinally spaced jam lugs joined to the base to extend above the top surface, the three jam lugs including a first and a second jam lug and an intermediate jam lug longitudinally intermediate the first and second jam lugs, each of the jam lugs having a lug jaw portion that has an undersurface extending diagonally and intersecting with the base to diverge away from the base at an acute angle of about 20 to 40 degrees to open transversely outwardly in overlapping relationship to the base, the intermediate jam lug undersurface opening outwardly transversely in the opposite direction of the opening of the undersurfaces of the first and second jam lug undersurfaces, the intersection of the undersurface of the intermediate jam lug being transversely offset from the intersection of the first and second lug undersurfaces with the base in the direction of the opening of the intermediate lug undersurface, a hook lug joined to the base in longitudinally spaced relationship to the first jam lug and being longitudinally opposite the first jam lug from the intermediate jam lug, the hook lug having a cutout opening outwardly in a direction opposite the opening of the first jam lug undersurface, the hook lug having an undersurface portion in spaced overlapping relationship to the base and an arcuate portion intersecting with the hook lug undersurface portion and the base, the intersection of the hook lug arcuate portion with the base being transversely offset from the intersection of the first jam lug undersurface with the base in a transverse direction opposite the opening of the first jam lug undersurface opening and an end lug joined to at least one of the base and the hook lug longitudinally opposite the hook lug from the first jam lug and having a wall portion defining a transverse aperture extending therethrough, the wall portion being transversely offset from the hook lug arcuate portion of the base in a direction that the first jam lug undersurface opens outwardly.

11. The cleat device of claim 10 wherein the undersurface of each of the jam lugs is defined by at least two longitudinally spaced, transversely extending lug ridges and that the base has a surface portion in spaced lapped relationship to each of the jam lug undersurfaces with at least one transverse ridge.

12. The cleat device of claim 10 wherein the end lug has an edge surface that is transversely most closely adjacent to the intersection of the arcuate portion with the base and has an edge surface that extends longitudinal and at a general right angle to the base and has the aperture opening therethrough, the end lug edge surface being transversely offset from the intersection of the arcuate portion with the base in the direction of the opening of the first lug undersurface.

13. The device of claim 10 wherein the base has a bottom surface portion and first and second elongated chisel point ridge portions extending downwardly of the bottom surface portion, at least one of the chisel point ridge portions extending longitudinally and the other of the chisel point ridge portions extending transversely.

14. The device of claim 13 wherein each of the chisel point ridge portions has horizontally elongated surfaces that converge in a downward direction away from the bottom surface.

15. A cleat device mountable to a supporting structure for having a cable or rope that supports a load laced thereto, comprising a base having a longitudinal axis, longitudinally opposite ends, a top surface and a generally planar bottom surface, at least three longitudinally spaced jam lugs joined to the base to extend above the top surface, the three jam lugs including a first and a second jam lug and an intermediate jam lug longitudinally intermediate the first and second jam lugs, each of the jam lugs at least one of alone and in combination with the base having a generally V-shaped notch, the intermediate jam lug notch opening transversely outwardly, the first and second lug notches opening transversely outwardly in a direction opposite the opening of the notch of the intermediate jam lug and on the transverse opposite side of the longitudinal axis from that of the notch of the intermediate jam lug to be transversely offset from the notch of the intermediate jam lug, a hook lug mounted to the base longitudinally opposite the first jam lug from the intermediate jam lug and having a cutout opening transversely outwardly in the direction opposite the opening of the notch of the first jam lug, the hook lug having an undersurface portion that is spaced from the base by a distance that is greater than the thickness of the cable, and an end lug joined to at least one of the base and the hook lug longitudinally opposite the hook lug from the first jam lug, the end lug having an aperture extending transversely therethrough for having the cable extended therethrough and elongated first and second chisel point ridge portions joined to the base bottom surface to extend away therefrom in a direction away from the top surface and extending horizontally relative to one another at an angle other than 180 degrees.

16. The device of claim 15 wherein the base has longitudinally opposite first and second end portions, a mounting screw apertures extending vertically therethrough adjacent each end portion, the ridge portions including a longitudinally extending portion adjacent each of the mounting screw apertures and a transversely extending portion adjacent each of the mounting screw apertures.

17. The device of claim 16 wherein each of the ridge portions has downwardly converging first and second surfaces with the first surface intersecting with the base bottom surface and extending at an obtuse angle relative to the base bottom surface and the second surface intersecting with the base bottom surface and extending at about right angles to the base bottom surface, the intersection of the ridge portion first surface being more remote from the adjacent mounting screw aperture than the intersection of the ridge portion second surface with the base bottom surface.

\* \* \* \* \*